（12） United States Patent
Koelzer et al.

(10) Patent No.: US 10,315,636 B2
(45) Date of Patent: Jun. 11, 2019

(54) TRACTOR PROTECTION VALVE

(71) Applicant: HALDEX BRAKE PRODUCTS CORPORATION, Kansas City, MO (US)

(72) Inventors: Robert L Koelzer, Olathe, KS (US); Randy Young, Kansas City, MO (US)

(73) Assignee: HALDEX BRAKE PRODUCTS CORPORATION, Kansas City, MO (US)

( * ) Notice: Subject to any disclaimer, the term of this patent is extended or adjusted under 35 U.S.C. 154(b) by 0 days.

(21) Appl. No.: 15/590,388

(22) Filed: May 9, 2017

(65) Prior Publication Data
US 2018/0326964 A1   Nov. 15, 2018

(51) Int. Cl.
| | | |
|---|---|---|
| *B60T 15/18* | (2006.01) | |
| *B60T 11/32* | (2006.01) | |
| *B60T 13/26* | (2006.01) | |
| *B60T 15/36* | (2006.01) | |
| *B60T 15/24* | (2006.01) | |
| *B60T 7/20* | (2006.01) | |

(52) U.S. Cl.
CPC ............... *B60T 11/326* (2013.01); *B60T 7/20* (2013.01); *B60T 13/26* (2013.01); *B60T 15/18* (2013.01); *B60T 15/246* (2013.01); *B60T 15/36* (2013.01)

(58) Field of Classification Search
CPC ...... B60T 13/261; B60T 13/263; B60T 15/54; B60T 11/326; B60T 13/265
See application file for complete search history.

(56) References Cited

U.S. PATENT DOCUMENTS

| 2,106,176 | A |   | 1/1938 | Huffman et al. | |
|---|---|---|---|---|---|
| 2,859,763 | A | * | 11/1958 | Fites | B60T 13/403 137/102 |
| 2,979,069 | A | * | 4/1961 | Valentine | B60T 13/268 137/102 |
| 3,866,623 | A |   | 2/1975 | Klimek | |
| 4,019,525 | A | * | 4/1977 | Horowitz | B60T 11/326 137/107 |
| 4,596,265 | A | * | 6/1986 | Goodell | B60T 15/54 137/102 |

(Continued)

OTHER PUBLICATIONS

Bendix, Service Data, Bendix® QR-L™ Inline Quick Release Valve, SD-03-906, Mar. 2004, 4 pages, Bendix Commercial Vehicle Systems LLC, USA.

(Continued)

*Primary Examiner* — Bradley T King
(74) *Attorney, Agent, or Firm* — Stinson LLP

(57) ABSTRACT

A tractor protection valve having a parking brake supply port, a parking brake delivery port, an exhaust port, and a quick release valve positioned between the parking brake supply port and the parking brake delivery port. The quick release valve is movable between a supply position allowing fluid to flow from the parking brake supply port to the parking brake delivery port and an exhaust position allowing fluid to flow from the parking brake delivery port to the exhaust port. The quick release valve may include a diaphragm that is movable between the supply and exhaust positions. The quick release valve may include a valve body that is positioned in a housing of the tractor protection valve.

23 Claims, 15 Drawing Sheets

(56) References Cited

U.S. PATENT DOCUMENTS

| | | | |
|---|---|---|---|
| 4,733,919 A * | 3/1988 | Jacobs | B60T 15/54 |
| | | | 137/102 |
| 4,915,456 A | 4/1990 | Gross et al. | |
| 5,046,786 A | 9/1991 | Johnston et al. | |
| 5,240,271 A | 8/1993 | Hart et al. | |
| 5,322,353 A | 6/1994 | Wallestad | |
| 5,417,479 A | 5/1995 | Wallestad et al. | |
| 5,425,572 A | 6/1995 | Koelzer et al. | |
| 5,553,928 A | 9/1996 | Hart et al. | |
| 5,615,929 A | 4/1997 | Broome | |
| 6,106,079 A | 8/2000 | Fisher | |
| 6,116,280 A | 9/2000 | Goodell | |
| 6,209,971 B1 | 4/2001 | Ho et al. | |
| 6,247,764 B1 | 6/2001 | Koelzer | |
| 6,267,135 B1 | 7/2001 | Ho | |
| 6,386,649 B1 | 5/2002 | Ross | |
| 6,626,083 B2 | 9/2003 | Bower | |
| 6,655,750 B2 | 12/2003 | Soupal | |
| 6,729,224 B1 | 5/2004 | Roy | |
| 7,571,738 B2 | 8/2009 | Ho et al. | |
| 7,658,453 B2 | 2/2010 | Soupal | |
| 7,780,245 B2 | 8/2010 | Ho | |
| 7,975,715 B2 | 7/2011 | Ramler et al. | |
| 8,100,047 B2 | 1/2012 | Fisher et al. | |
| 8,267,107 B2 | 9/2012 | Ho | |
| 8,297,713 B2 | 10/2012 | Soupal | |
| 2012/0247880 A1 | 10/2012 | Bradford | |

OTHER PUBLICATIONS

Bendix, Service Data, Bendix® QRV$^{TM}$ and QR-1$^{TM}$ Quick Release Valves, SD-03-901, Jul. 2006, 4 pages, Bendix Commercial Vehicle Systems LLC, USA.

Bendix, Sevice Data, Bendix® TP-3DC$^{TM}$ Tractor Protection Valve with Double Check, SD-03-3656, Jun. 2007, 8 pages, Bendix Commercial Vehicle Systems LLC, USA.

Bendix, Service Data, Bendix® TP-5$^{TM}$ Tractor Protection Valve, SD-03-3655, May 2011, 4 pages, Bendix Commercial Vehicle Systems LLC, USA.

\* cited by examiner

TRACTOR PROTECTION VALVE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present application relates generally to pneumatic brake system valves and, in particular, to a tractor protection valve.

2. Description of Related Art

A tractor protection valve supplies air from a tractor, or heavy duty truck, to the service and emergency (or parking) brake systems of a trailer that is attached to the tractor. One type of tractor protection valve described in U.S. Pat. No. 6,106,079 includes an anti-compounding feature to prevent the combined application of a trailer's service and emergency brakes. If there is a loss of air in the trailer's braking system, the valve also prevents a loss of air within the tractor's braking system so that a driver can continue to safely operate the tractor's brakes.

In one type of conventional braking system, the tractor protection valve is connected to the emergency brakes on the trailer through air lines and a gladhand connection that may be as long as 40-60 feet. Before the trailer's emergency brakes may be fully applied, any pressurized air within the air lines leading from the tractor to the trailer must be exhausted to the atmosphere. The air within these air lines must pass through the tractor protection valve through another 10-20 feet of air lines to a manifold dash valve before being exhausted to the atmosphere. In another type of conventional system, a separate exhaust valve must be positioned in the air flow path between the trailer and the tractor protection valve to exhaust the air within the air lines between the tractor and the trailer before the trailer's emergency brakes are applied.

BRIEF SUMMARY OF THE INVENTION

One embodiment of the invention described herein is directed to a tractor protection valve having a parking brake supply port, a parking brake delivery port, an exhaust port, and a quick release valve. The quick release valve has a diaphragm that is positioned between the parking brake supply port and the parking brake delivery port. The diaphragm is movable between a supply position allowing fluid to flow from the parking brake supply port to the parking brake delivery port and an exhaust position allowing fluid to flow from the parking brake delivery port to the exhaust port. The quick release valve allows the tractor protection valve to quickly exhaust air within air lines leading to parking brakes on a trailer so that the trailer's parking brakes may be engaged in a timely manner. Preferably, the trailer's parking brakes are applied within approximately 1.5 seconds or less after a driver actuates a manifold dash valve to engage the parking brakes.

Another embodiment of the invention described herein is directed to a tractor protection valve having a housing defining a parking brake supply port, a parking brake delivery port, and an exhaust port. A quick release valve has a valve body that is positioned in the housing between the parking brake supply port and the parking brake delivery port. The valve body has a first channel and a second channel. At least a portion of the quick release valve is movable between a supply position allowing fluid to flow from the parking brake supply port through the first channel to the parking brake delivery port and an exhaust position allowing fluid to flow from the parking brake delivery port through the second channel to the exhaust port.

In another embodiment of the invention described herein, a tractor protection valve has a parking brake supply port, a parking brake delivery port, a parking brake exhaust port, a service brake supply port, a service brake delivery port, a service brake exhaust port, and a quick release valve positioned between the parking brake supply port and the parking brake delivery port. At least a portion of the quick release valve is movable between a supply position allowing fluid to flow from the parking brake supply port to the parking brake delivery port and an exhaust position allowing fluid to flow from the parking brake delivery port to the parking brake exhaust port. A service brake valve is moveable between a supply position allowing fluid to flow from the service brake supply port to the service brake delivery port and an exhaust position allowing fluid to flow from the service brake delivery port to the service brake exhaust port. The service brake valve is in the exhaust position when the quick release valve is in the exhaust position.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Figure 1:
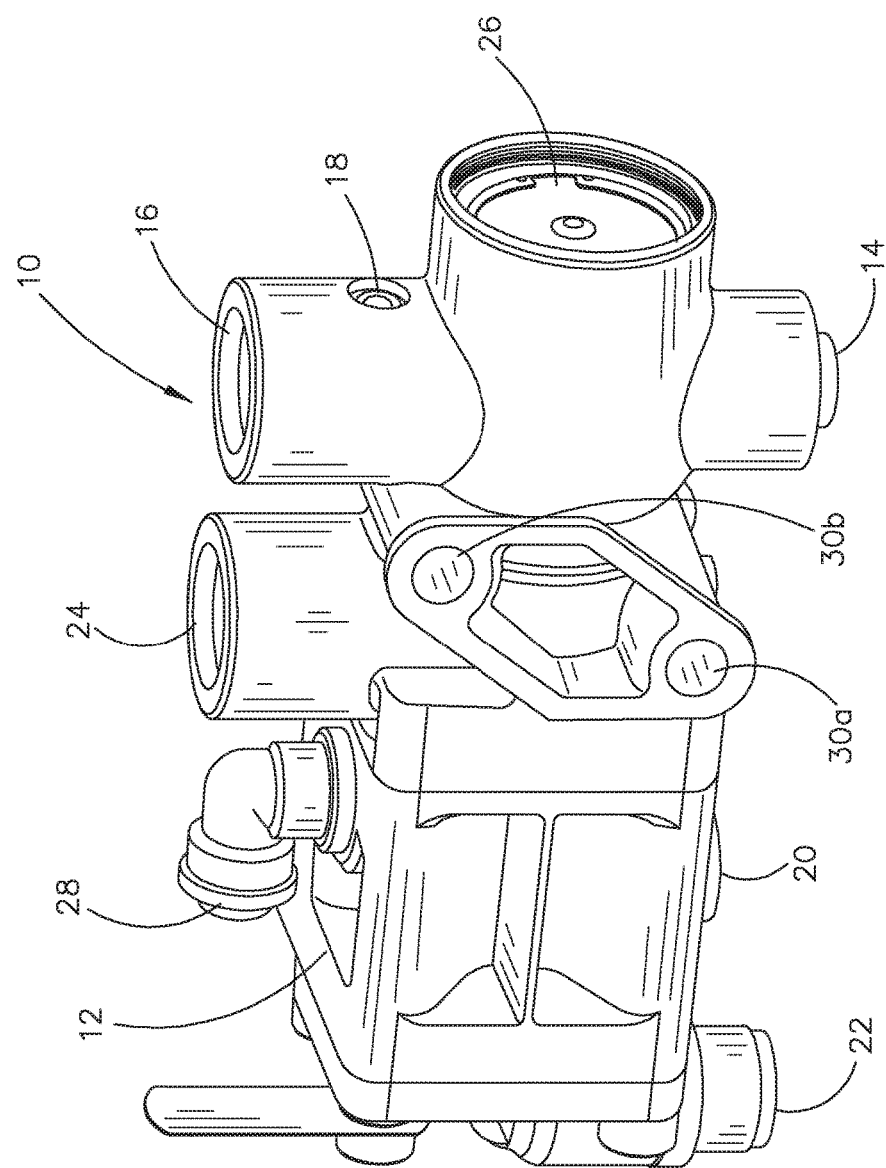
FIG. 1 is a perspective view of a tractor protection valve in accordance with an embodiment of the invention described herein.
Figure 2:
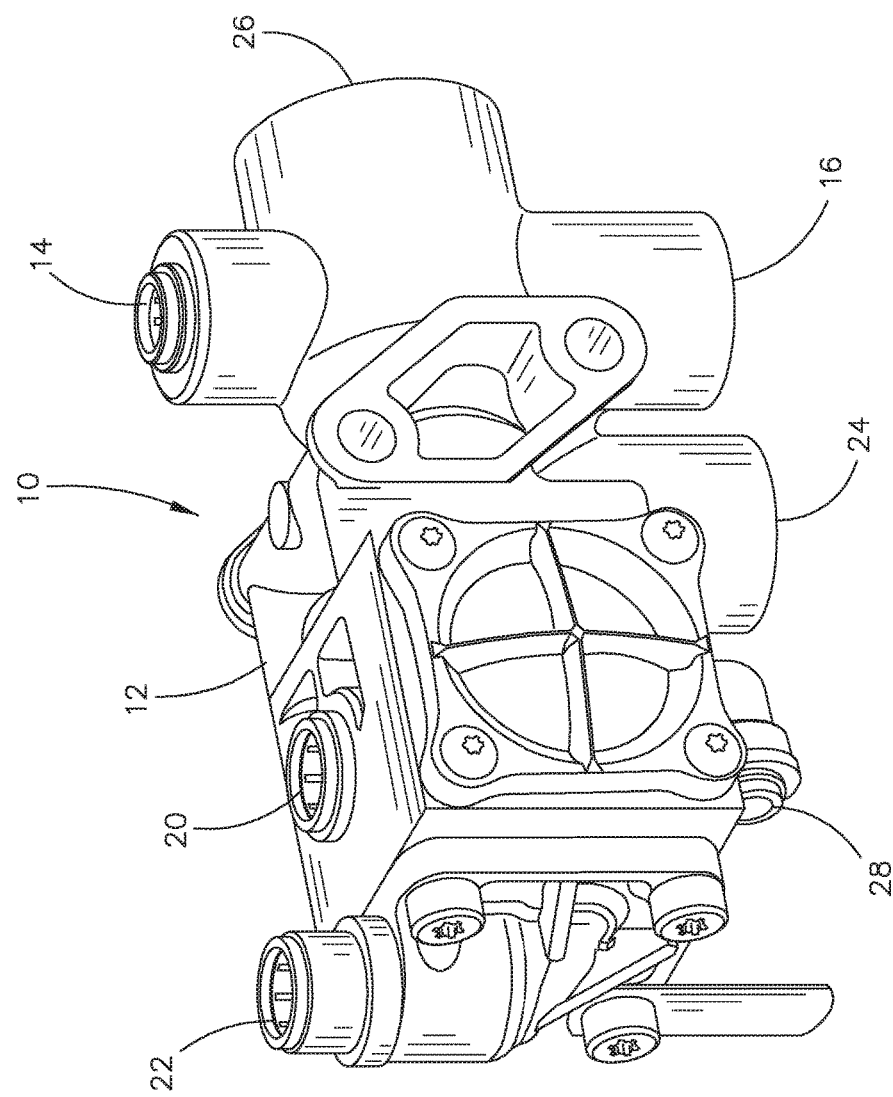
FIG. 2 is a rear perspective view of the tractor protection valve of FIG. 1.
Figure 3:
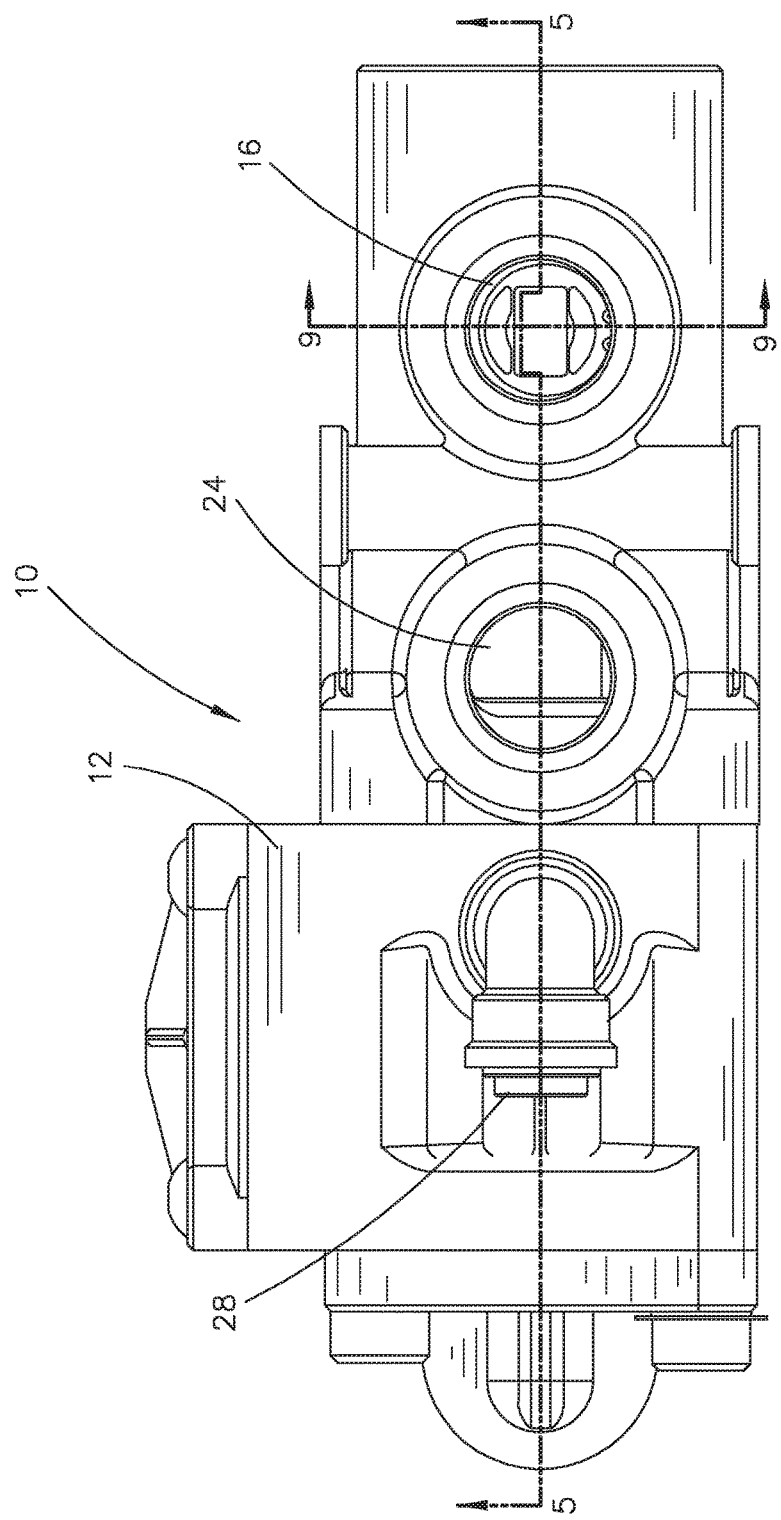
FIG. 3 is a top plan view of the tractor protection valve of FIG. 1.
Figure 4:
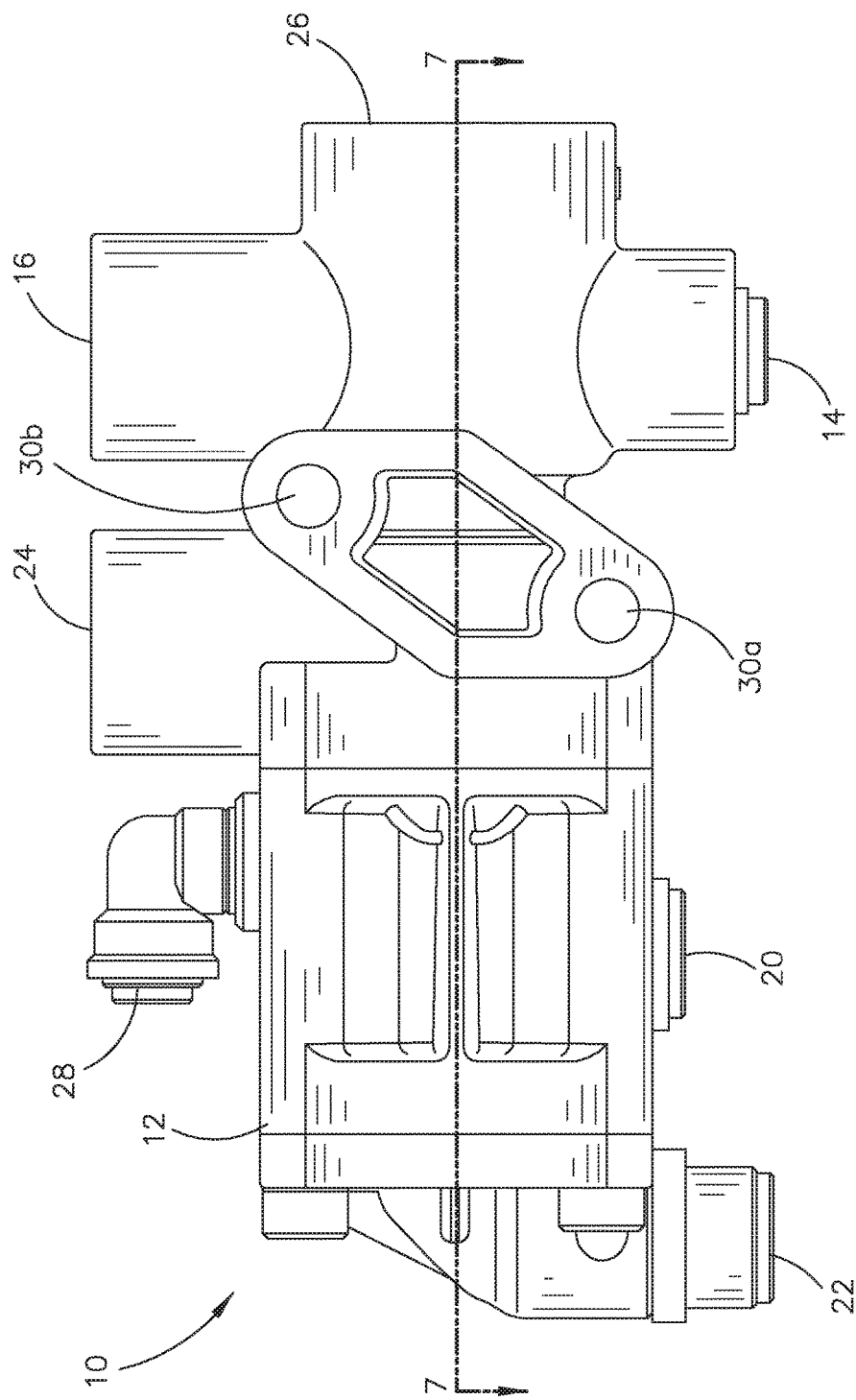
FIG. 4 is a side elevational view of the tractor protection valve of FIG. 1.

A tractor protection valve in accordance with an embodiment of the invention described and claimed herein is identified generally by the numeral 10 in FIG. 1. Tractor protection valve 10 has a housing 12 that defines a parking brake supply port 14, a parking brake delivery port 16, a parking brake exhaust port 18, first and second service brake supply ports 20 and 22, a service brake delivery port 24, a service brake exhaust port 26, and a stop light port 28. Housing 12 includes holes 30a-b for receiving fasteners (not shown) to mount the housing 12 to a vehicle. As described in detail below, tractor protection valve 10 includes an integral quick release valve 32 (FIG. 5) that is positioned adjacent the parking brake delivery port 16 for allowing the quick release of air from air lines 148 and 150 (FIG. 15) connecting the parking brake delivery port 16 to a full function valve 154 on a trailer.

Figure 5:
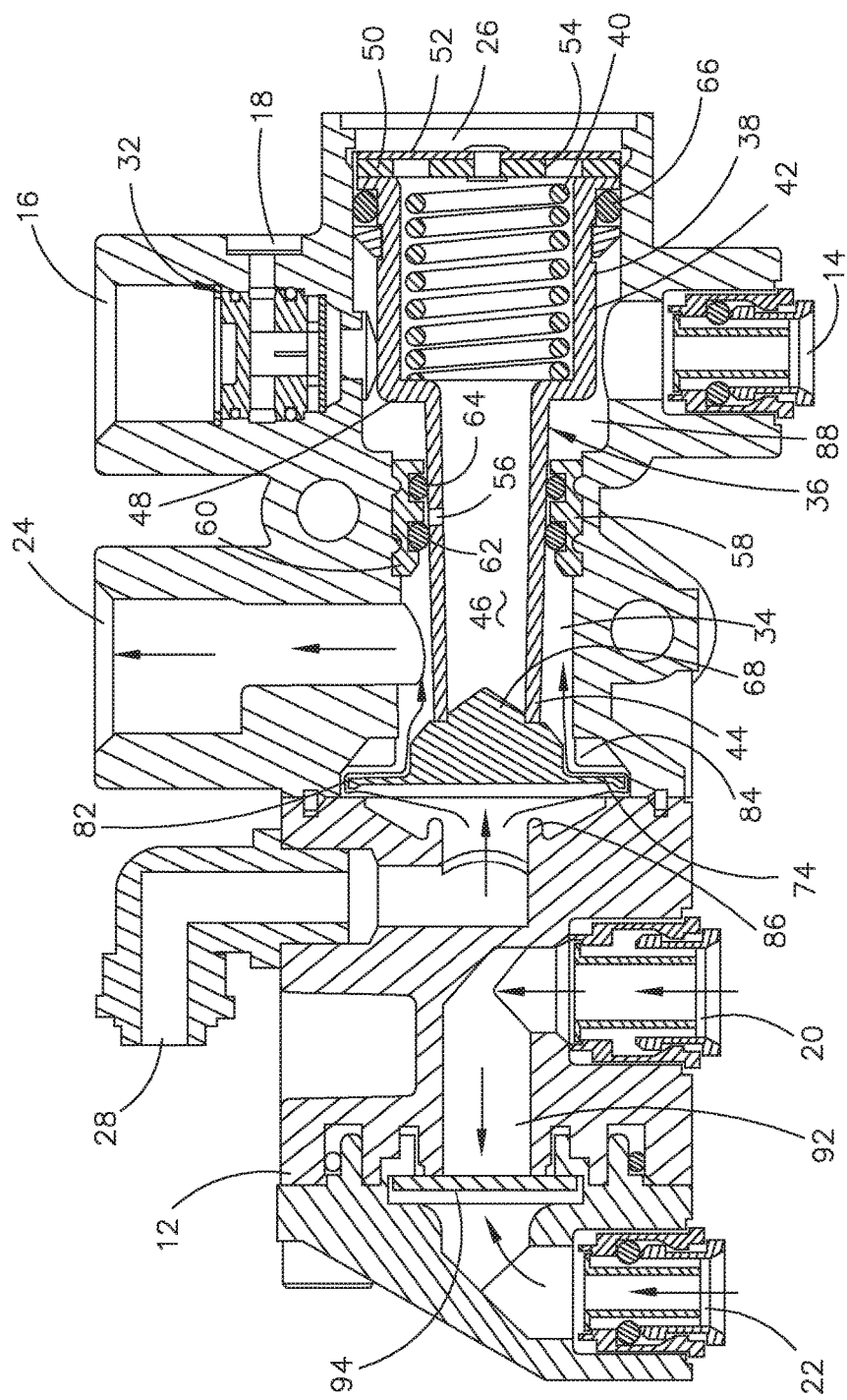
FIG. 5 is a cross-sectional view taken through the line 5-5 in FIG. 3 showing a piston of a service brake valve in a supply position.

Referring to FIG. 5, housing 12 defines an internal passageway 34 within which is positioned a service brake valve 36 and quick release valve 32. Service brake valve 36 includes a piston 38 that is moveable between the supply position shown in FIG. 5 and the exhaust position shown in FIG. 6. In the supply position shown in FIG. 5, fluid can flow from the service brake supply ports 20 and 22 to the service brake delivery port 24. In the exhaust position shown in FIG. 6, fluid can flow from the service brake delivery port 24 to the service brake exhaust port 26. A spring 40 biases piston 38 to the exhaust position.

Piston 38 includes a first cylindrical wall 42 and a second cylindrical wall 44 extending outward from the first cylindrical wall 42. First and second cylindrical walls 42 and 44 surround an internal cavity 46. First cylindrical wall 42 has a greater diameter than second cylindrical wall 44, which forms a shoulder 48. Spring 40 is positioned within internal cavity 46 and has one end that abuts shoulder 48. The opposite end of spring 40 abuts a circular plate 50 that is attached to housing 12. A filter 52 is attached to circular plate 50 to prevent contaminants from entering housing 12. Circular plate 50 includes openings, one of which is identified as 54, to allow air to exhaust from housing 12 through service brake exhaust port 26, as shown in FIG. 6.

Piston 38 has an opening 56 in its second cylindrical wall 44. The opening 56 and internal cavity 46 form a passage through which fluid can flow from the service brake delivery port 24 through the service brake exhaust port 26 when the piston 38 is in the exhaust position shown in FIG. 6. A seal assembly 58 is mounted to the housing 12 and surrounds a portion of the second cylindrical wall 44 of piston 38. The seal assembly 58 includes a cartridge 60 mounted to housing 12 and a pair of o-ring seals 62 and 64 each of which sealingly engage the piston 38. When the piston 38 is in the supply position shown in FIG. 5, the opening 56 is positioned between the o-ring seals 62 and 64 so that air cannot flow from the service brake delivery port 24 through the opening 56 and service brake exhaust port 26. O-ring seal 64 seals opening 56 from the parking brake delivery port 14. When the piston 38 is in the exhaust position shown in FIG. 6, the opening 56 is positioned outside of the o-ring seals 62 and 64 so that air can flow from the service brake delivery port 24 through the opening 56.

Figure 6:
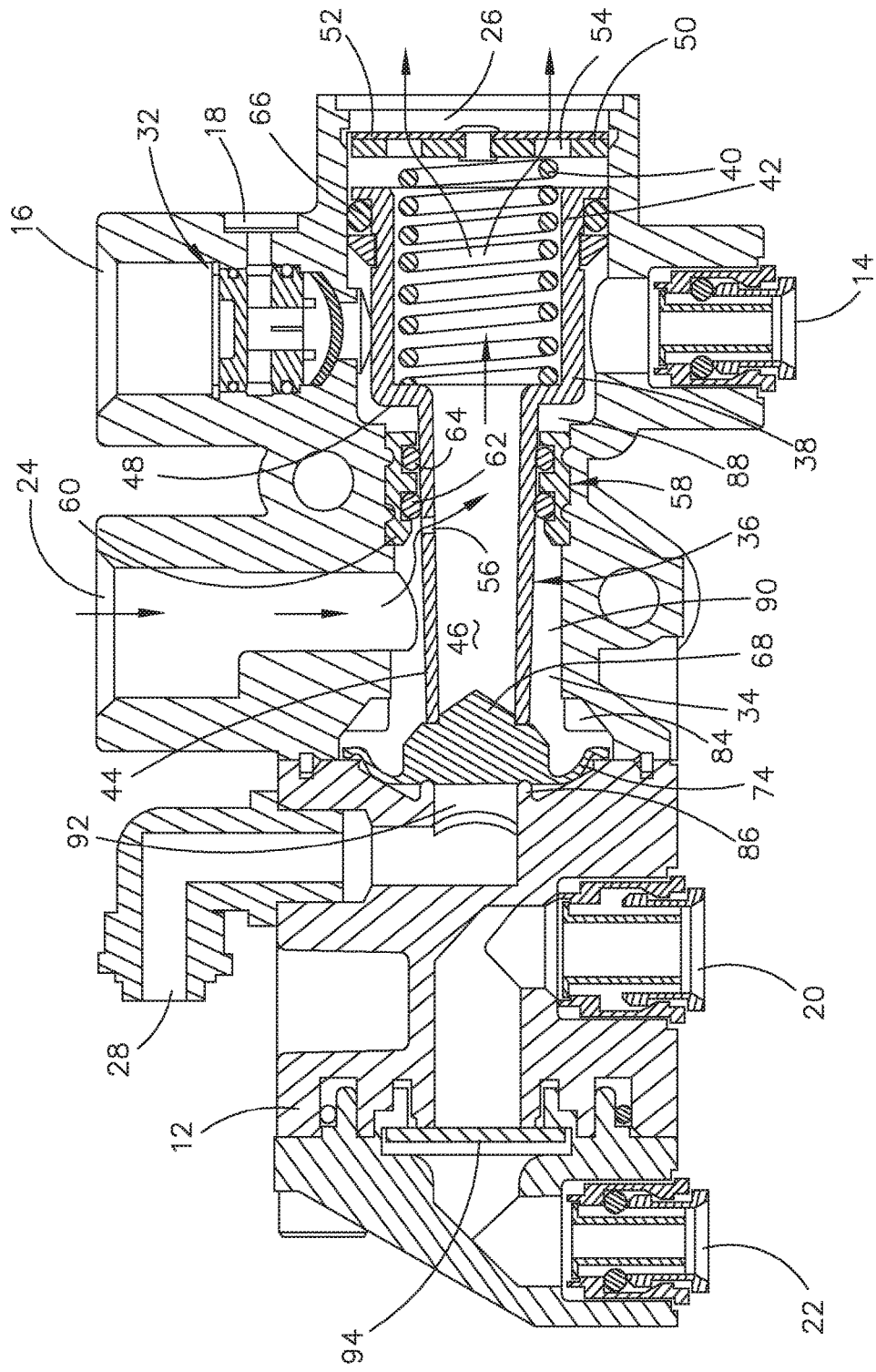
FIG. 6 is a cross-sectional view similar to FIG. 5 showing the piston in an exhaust position.

Piston 38 moves from the exhaust position shown in FIG. 6 to the supply position shown in FIG. 5 when air pressure at the parking brake supply port 14 exerts a force on the shoulder 48 of piston 38 that exceeds the biasing force of spring 40. An o-ring seal 66 sealingly engages piston 38 and housing 12 to seal parking brake supply port 14 from service brake exhaust port 26.

Figure 7:
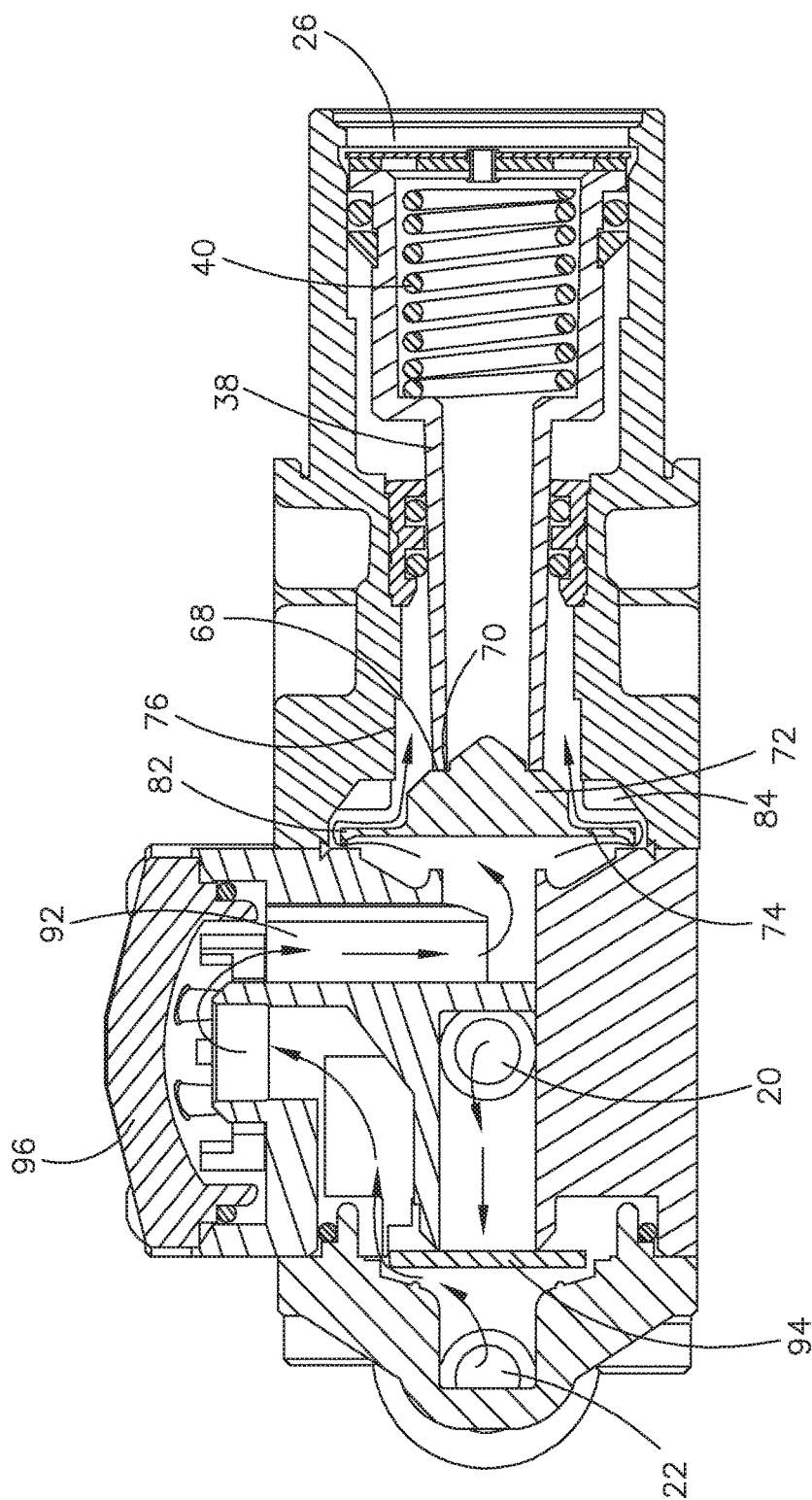
FIG. 7 is a cross-sectional view taken through the line 7-7 in FIG. 4.
Figure 8:
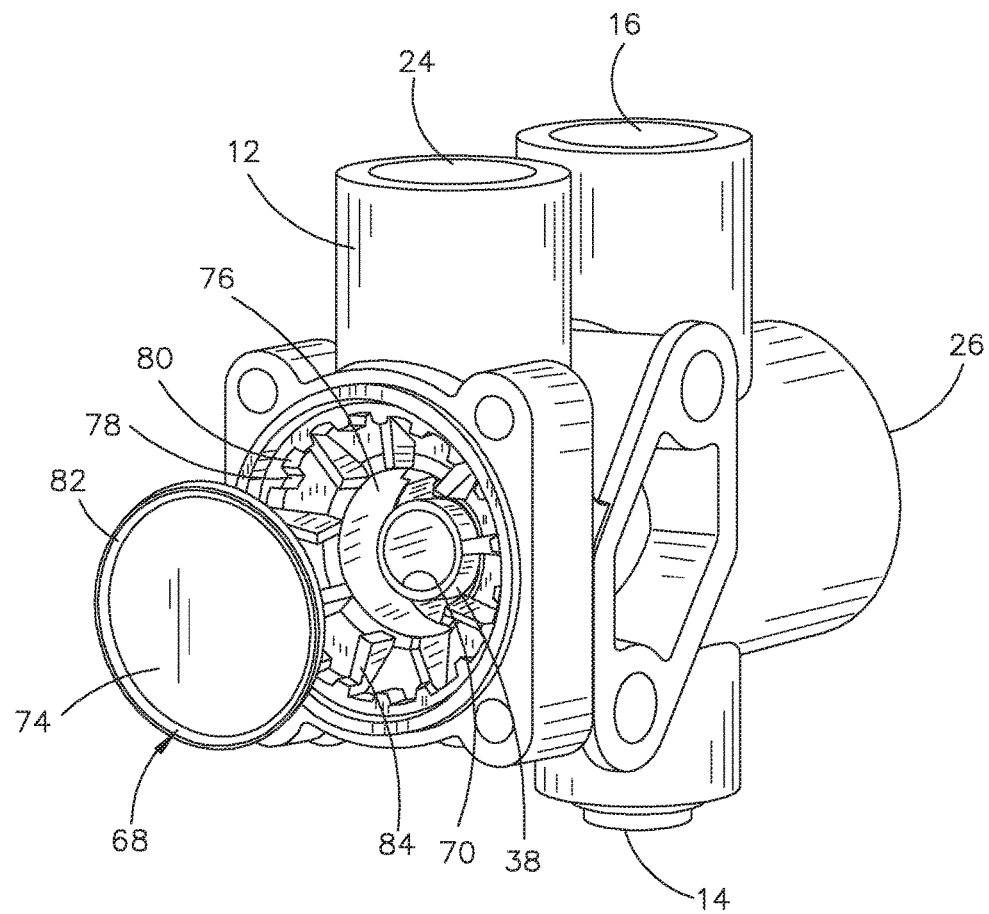
FIG. 8 is a partially exploded view of a portion of a housing and the piston of the tractor protection valve of FIG. 1.

Referring to FIG. 7, a diaphragm 68 is mounted on the end of piston 38 opposite spring 40. A portion of diaphragm 68 is received within an opening 70 at the end of piston 38 to form a seal between diaphragm 68 and piston 38. The diaphragm 68 includes a central section 72 and a flange 74 extending outward from the central section 72. Central section 72 of diaphragm 68 has a diameter that is less than a diameter of a cylindrical wall 76 of housing 12 so that air can flow between the diaphragm 68 and wall 76. Referring to FIG. 8, a plurality of alternating ridges 78 and notches 80 are formed in a portion of housing 12 surrounding flange 74 of diaphragm 68. Air can flow through notches 80 around the peripheral edge 82 of flange 74 when piston 38 is in the supply position shown in FIGS. 5 and 7. A plurality of spaced apart protrusions 84 are also formed in housing 12 for supporting flange 74 when piston 38 is in the supply position so that air can flow around the flange 74 and between the protrusions 84 as it flows to the service brake delivery port 24.

When piston 38 is in the exhaust position shown in FIG. 6, diaphragm 68 sealingly engages a circular ridge 86 of housing 12 to seal service brake supply ports 20 and 22 from service brake delivery port 24. In this position, diaphragm 68 also seals service brake supply ports 20 and 22 from service brake exhaust port 26.

As shown in FIG. 6, internal passageway 34 of housing 12 is divided into several sections by piston 38, diaphragm 68 and seal assembly 58. A parking brake section 88 is positioned between the seal assembly 58, piston 38, seal 66, and quick release valve 32. Parking brake supply port 14 is in fluid communication with the parking brake section 88 at all times. A service brake delivery section 90 is positioned between the seal assembly 58, diaphragm 68, and piston 38. Service brake delivery section 90 is in fluid communication with service brake delivery port 24 at all times. A service brake supply section 92, as best shown in FIG. 7, is positioned between diaphragm 68, stop light port 28, and service brake supply ports 20 and 22. A diaphragm 94 is positioned within service brake supply section 92 between service brake supply ports 20 and 22. Diaphragm 94 is moveable in response to a pressure differential of air within service brake supply ports 20 and 22 so that air from at least one of the ports 20 and 22 is in fluid communication with diaphragm 68. A cover 96 shown in FIG. 7 may be removed and replaced with an optional hand control port (not shown) operable to be connected to a hand control switch 162 (FIG. 15) for activating the service brakes 160a-d (FIG. 15) on a trailer connected to tractor protection valve 10. Stop light port 28 may connect to a brake light circuit (not shown) to activate brake lights when air is supplied from one of service brake supply ports 20 and 22 to service brake delivery port 24.

Figure 9:
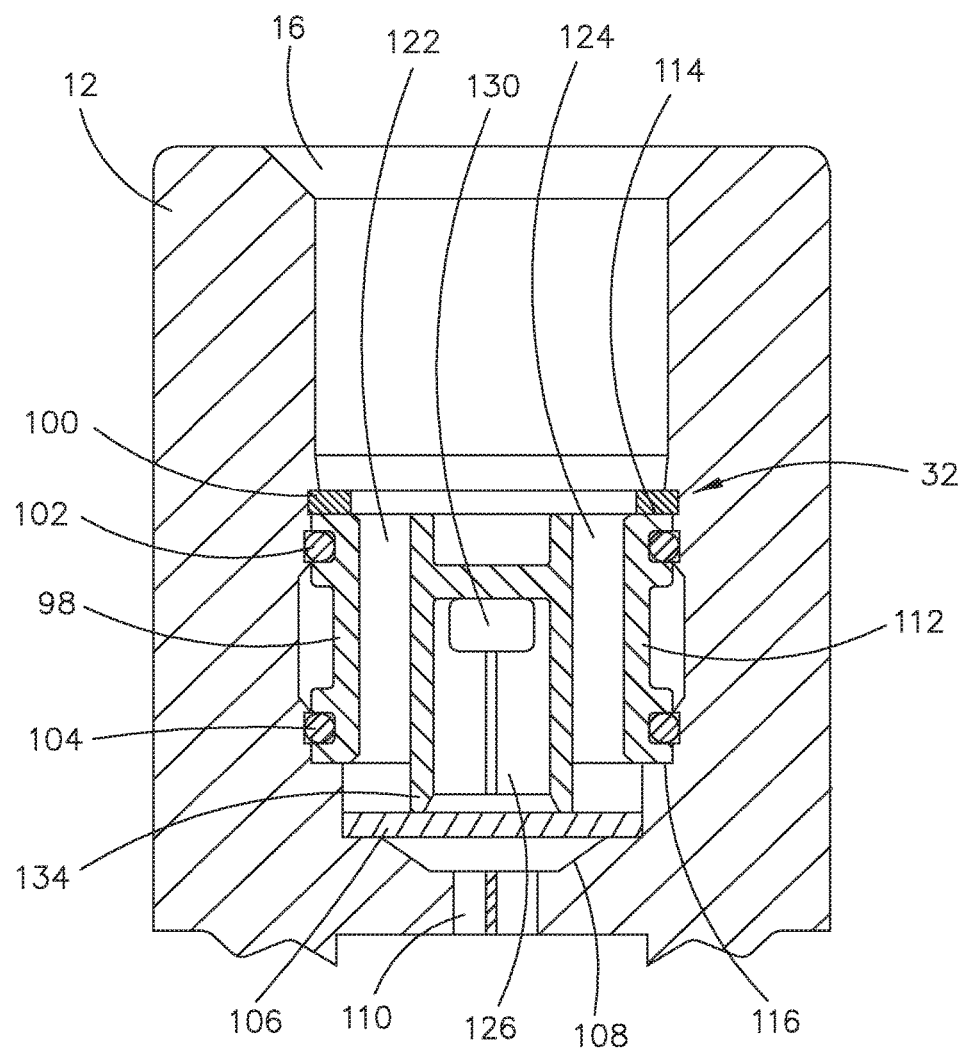
FIG. 9 is a cross-sectional view taken through the line 9-9 in FIG. 3 showing a quick release valve of the tractor protection valve of FIG. 1.

Referring to FIG. 9, quick release valve 32 includes a valve body 98 mounted within housing 12 via a spring clip 100. Valve body 98 includes grooves that receive o-ring seals 102 and 104, which sealingly engage housing 12. A moveable diaphragm 106 is positioned between valve body 98 and a valve seat 108 formed in housing 12 above a passageway 110 leading to parking brake supply port 14. Valve body 98 and diaphragm 106 are positioned between parking brake supply port 14 and parking brake delivery port 16. Quick release valve 32 is preferably configured for insertion into housing 12 through the parking brake delivery port 16.

Figure 12:
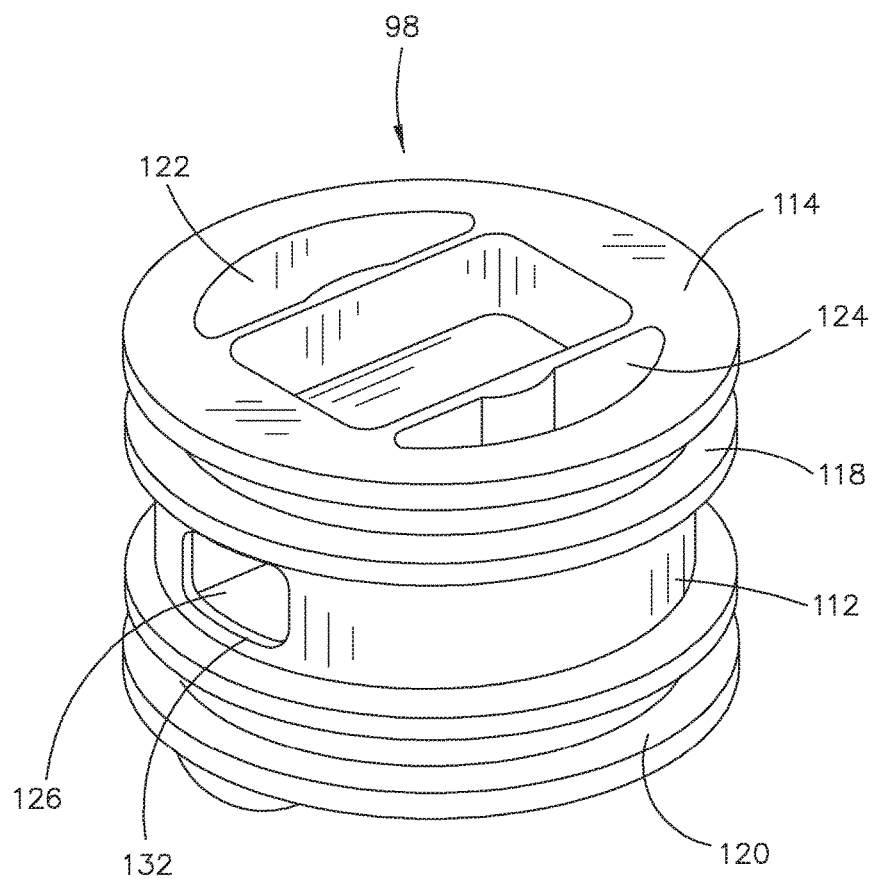
FIG. 12 is a perspective view of a valve body of the quick release valve.
Figure 13:
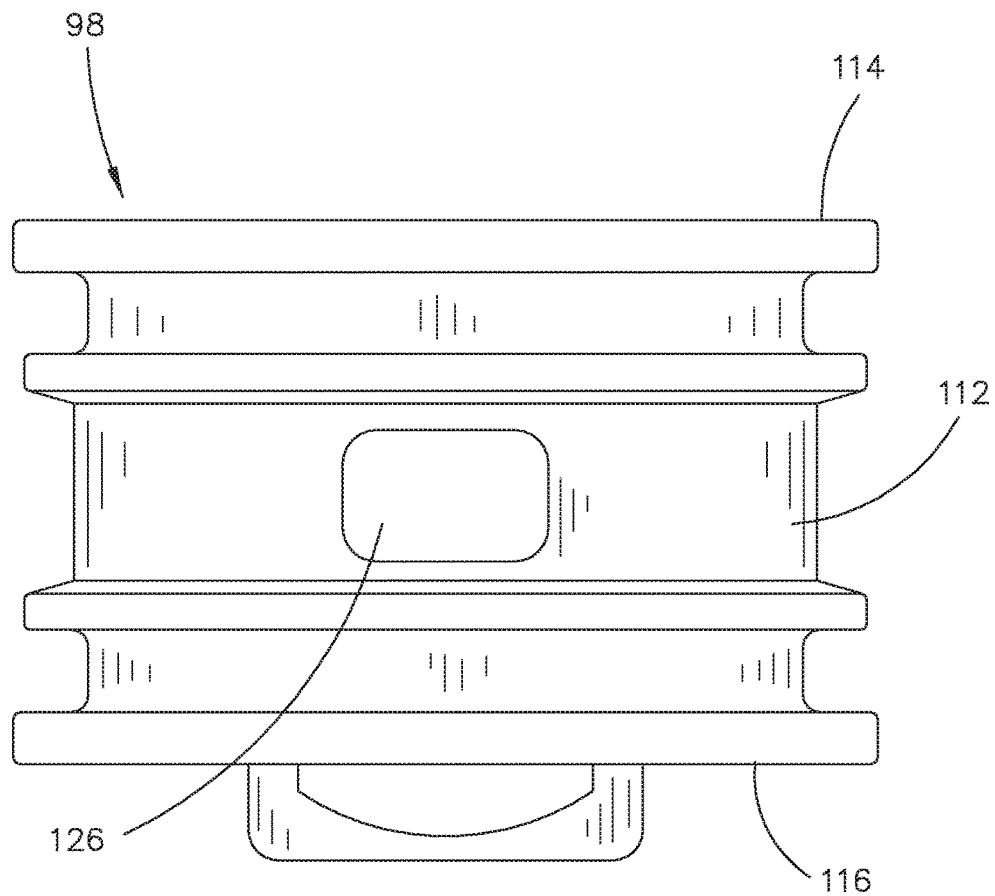
FIG. 13 is a side elevational view of the valve body shown in FIG. 12.
Figure 14:
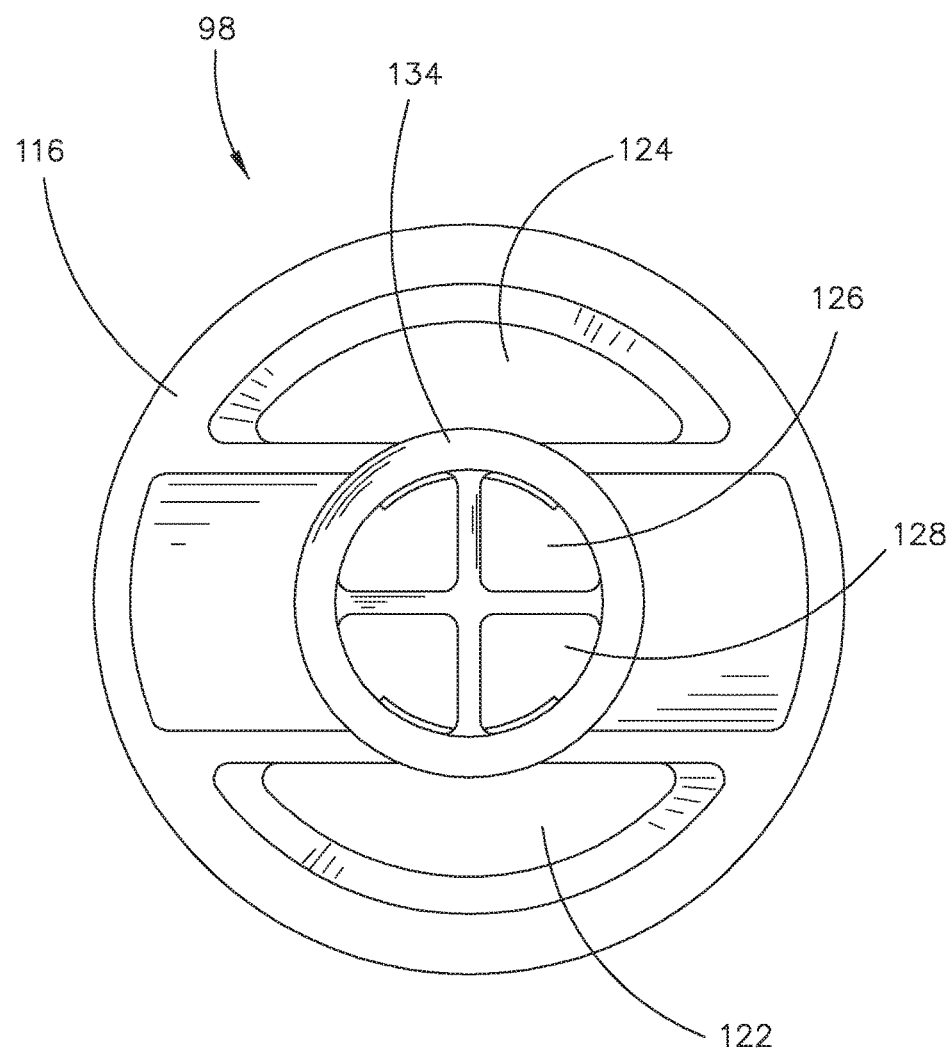
FIG. 14 is a bottom plan view of the valve body shown in FIG. 12.

Valve body 98 is generally cylindrical and includes a side wall 112 that is joined to a top wall 114 and a bottom wall 116. Grooves 118 and 120, shown in FIG. 12, are formed in side wall 112 for receiving seals 102 and 104. Valve body 98 includes first and second supply channels 122 and 124 each extending through valve body 98 from an opening in top wall 114 to an opening in bottom wall 116. Valve body 98 includes an exhaust channel 126 that extends through valve body 98 from a plurality of openings 128 (FIG. 14) in bottom wall 116 upward to a central portion of valve body 98 and then horizontally outward to an opening 130 (FIG. 10) in side wall 112. Side wall 112 includes another opening 132 (FIG. 12) that is formed in side wall 112 opposite opening 130. Opening 132 is also in fluid communication with exhaust channel 126. First and second supply channels 122 and 124 do not intersect exhaust channel 126 within valve body 98.

Valve body 98 includes a circular valve seat 134 surrounding the openings 128. Diaphragm 106 is a flexible sheet of material that can flex or move between the resting position shown in FIG. 9, the supply position shown in FIG. 10, and the exhaust position shown in FIG. 11. In the resting position shown in FIG. 9, the forces exerted by air pressure on each side of the diaphragm 106 are approximately equal. Diaphragm 106 moves from the resting or exhaust position to the supply position in response to increased air pressure in the parking brake supply port 14.

Figure 10:
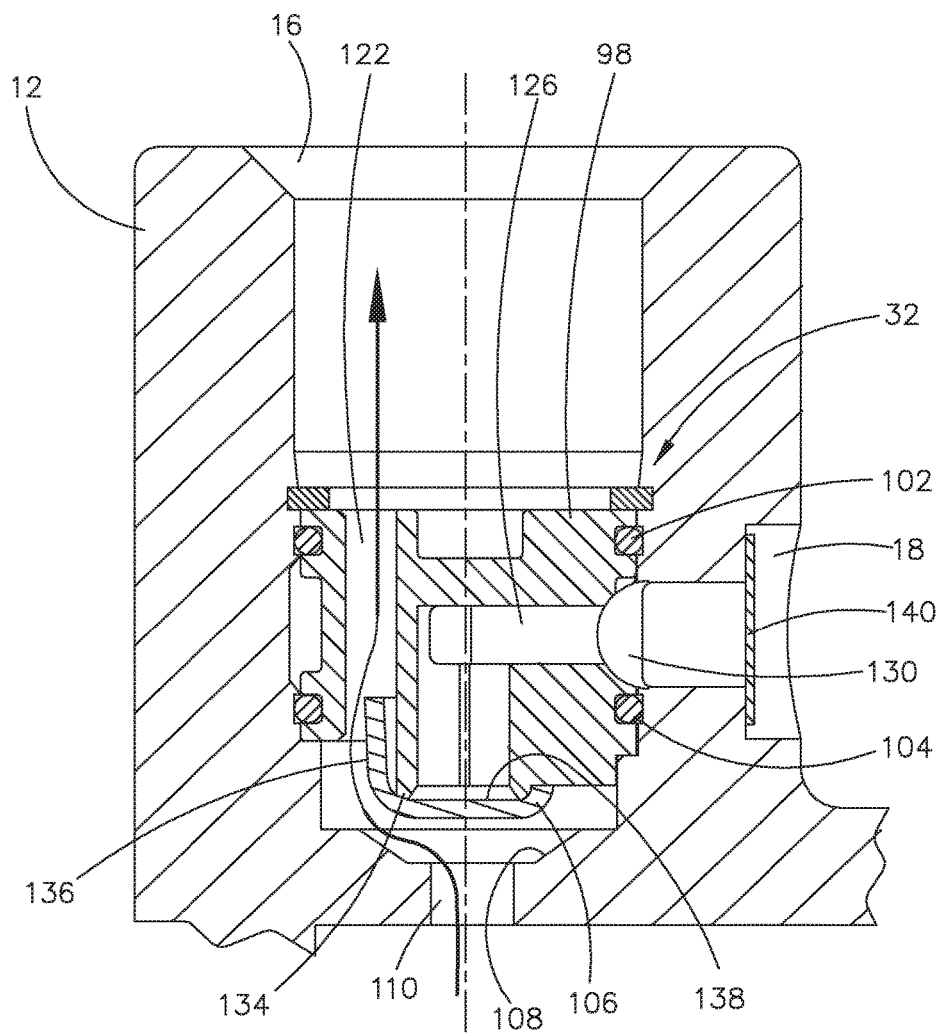
FIG. 10 is a cross-sectional view of the quick release valve that is divided through a center of the drawing so that the left hand portion is taken through the line 9-9 in FIG. 3 and the right hand portion is taken through the line 5-5 in FIG. 3 and showing a diaphragm in a supply position.

In the supply position shown in FIG. 10, the force exerted by air pressure on a first side 136 of diaphragm 106 from parking brake supply port 14 exceeds the force exerted on the opposite side 138 of diaphragm 106 from atmospheric air at parking brake exhaust port 18. This causes the peripheral edge of diaphragm 106 to flex upward so that air can flow from parking brake supply port 14 through passageway 110, around diaphragm 106 and through supply channels 122 and 124 in valve body 98 to parking brake delivery port 16. In this supply position, a central portion of diaphragm 106 sealingly engages valve seat 134 of valve body 98 to seal exhaust channel 126 from the air passing to parking brake delivery port 16. Seals 102 and 104 and diaphragm 106 isolate exhaust channel 126 and parking brake exhaust port 18 from air flowing through first and second supply channels 122 and 124 from parking brake supply port 14 to parking brake delivery port 16.

Figure 11:
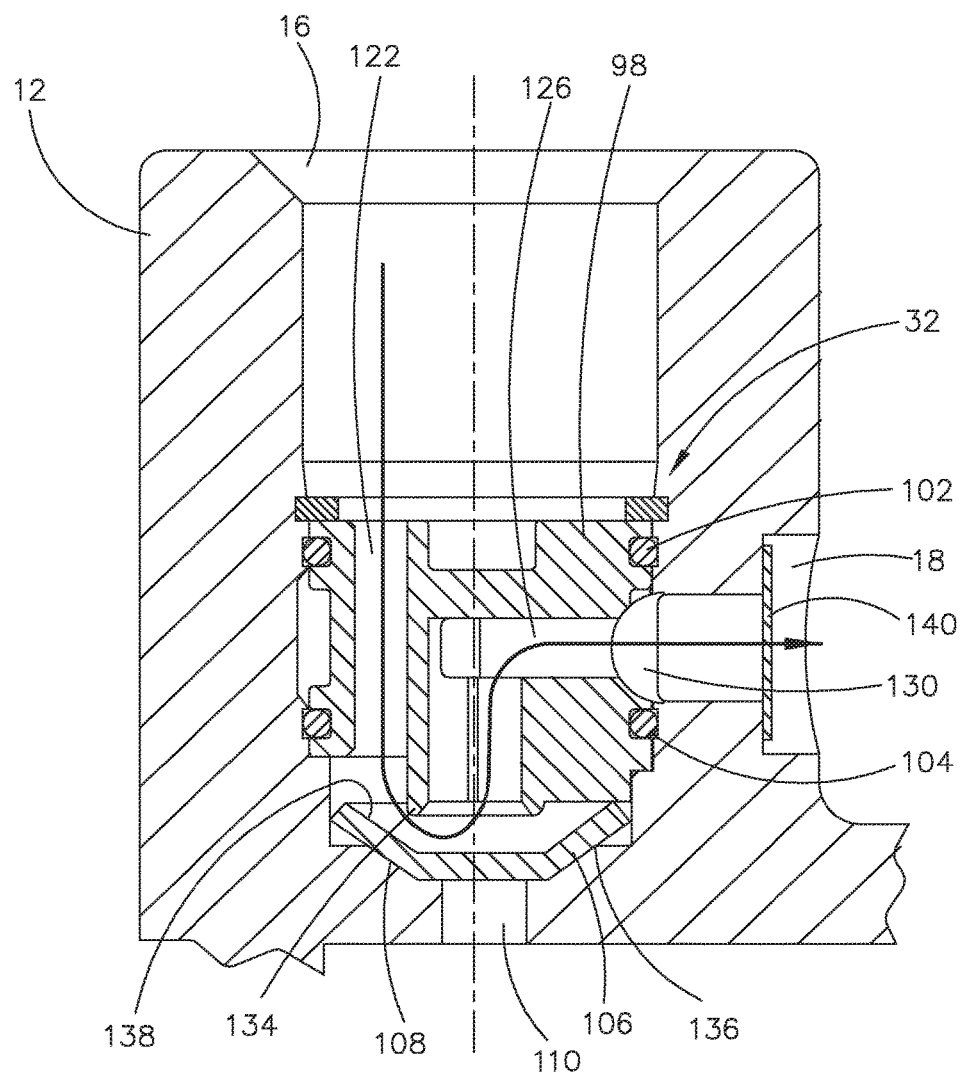
FIG. 11 is a cross-sectional view of the quick release valve that is divided through a center of the drawing so that the left hand portion is taken through the line 9-9 in FIG. 3 and the right hand portion is taken through the line 5-5 in FIG. 3 and showing the diaphragm in an exhaust position.

In the exhaust position shown in FIG. 11, the force exerted by air pressure on side 138 of diaphragm 106 from parking brake delivery port 16 exceeds the force exerted on side 136 of diaphragm 106 from parking brake supply port 14. This causes the diaphragm 106 to move downward and engage valve seat 108 of housing 12. In this position, air can flow from parking brake delivery port 16 through supply channels 122 and 124 in valve body 98, around valve seat 134, upward through exhaust channel 126 and out through parking brake exhaust port 18. A filter 140 is positioned in exhaust port 18 to prevent contaminants from entering quick release valve 32. Diaphragm 106 sealingly engages valve seat 108 to prevent the air exhausting through parking brake exhaust port 18 from entering passageway 110 and parking brake supply port 14. Seals 102 and 104 form a seal between valve body 98 and housing 12 so that air passing through exhaust channel 126 exits housing 12 at parking brake exhaust port 18.

Figure 15:
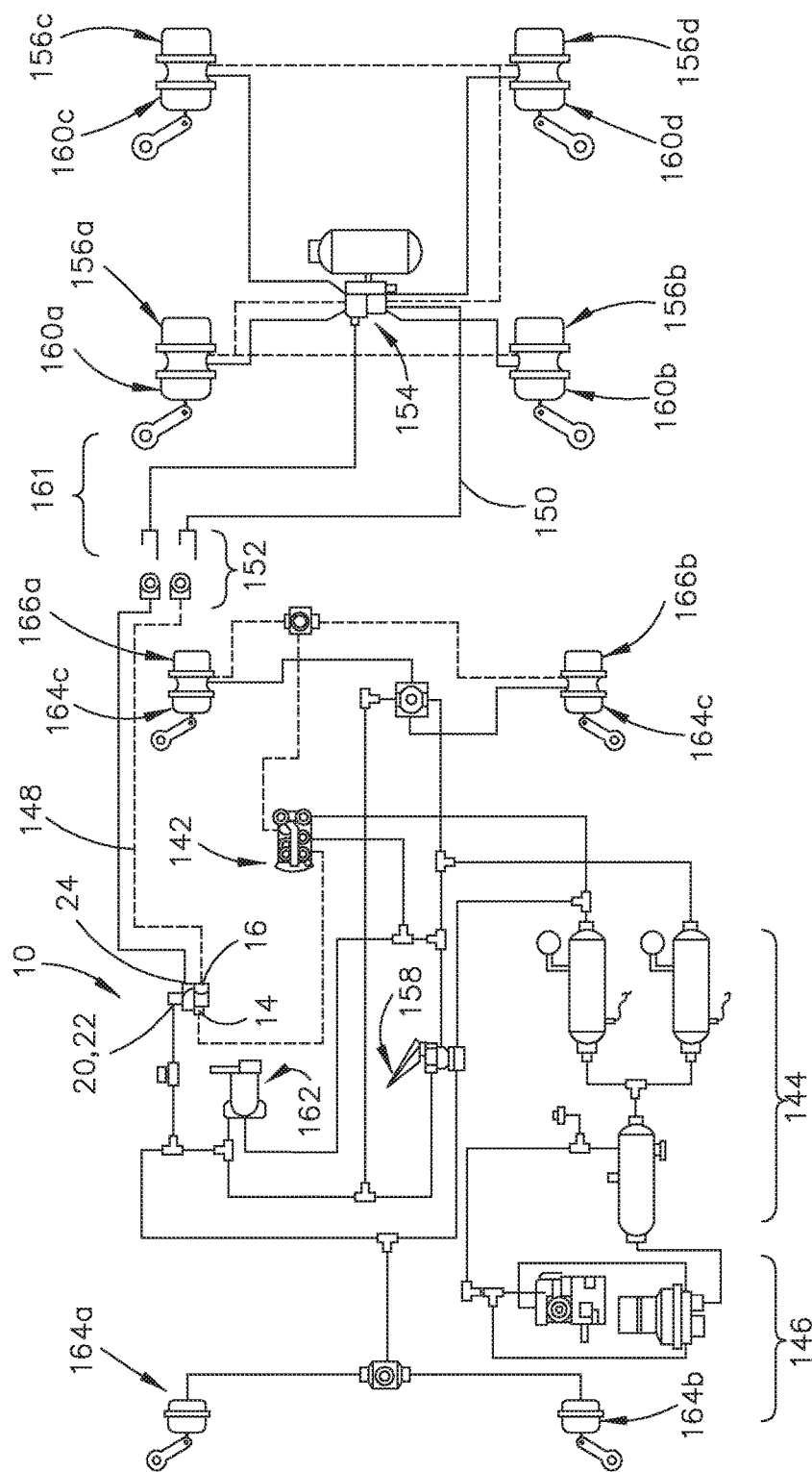
FIG. 15 is a schematic diagram of a pneumatic braking system of a tractor and a trailer that includes the tractor protection valve of FIG. 1.

Referring to FIG. 15, tractor protection valve 10 is preferably mounted to a tractor or truck that has a pneumatic braking system and that is capable of pulling a trailer. Parking brake supply port 14 of tractor protection valve 10 is preferably connected to a manifold dash valve 142 that supplies air to parking brake supply port 14 via one or more air reservoirs 144 that are in fluid communication with an air compressor and air dryer system 146. Parking brake delivery port 16 is preferably connected via air lines 148 and 150 and a gladhand connection 152 to a full function valve 154 on a trailer for supplying air to the parking brake chambers 156*a*-*d* of brake actuators on the trailer. Service brake supply ports 20 and 22 are preferably connected to a foot brake valve 158 capable of selectively applying air from air reservoirs 144 to the service brake supply ports 20 and 22 in response to actuation by a driver of the tractor. Service brake delivery port 24 is preferably connected via air lines and a gladhand connection 161 to full function valve 154 for supplying air to the service brake chambers 160*a*-*d* of brake actuators on the trailer. A hand control valve 162 positioned inside of the tractor cab may be connected to tractor protection valve 10 to supply air to service brake chambers 160*a*-*d* on the trailer in response to driver actuation. Foot brake valve 158 is also preferably capable of selectively providing air to service brake chambers 164*a*-*d* on the tractor. Manifold dash valve 142 is connected to the parking brake chambers 166*a*-*b* of brake actuators on the tractor for providing air to the parking brake chambers 166*a*-*b*. Manifold dash valve 142 is preferably mounted in the tractor cab for actuation by the driver. Gladhand connections 152 and 161 connect the components mounted on the tractor to the components mounted on the trailer. The tractor and trailer air system shown in FIG. 15 is exemplary only as the tractor protection valve 10 described herein may be used in connection with alternative air systems.

In operation, when it is desired to supply parking brake chambers 156*a*-*d* on the trailer with air to release the parking brakes and allow the tractor and trailer to move, the driver actuates manifold dash valve 142 by, for example, pushing a button on the manifold dash valve 142. Air then flows from reservoirs 144 through the manifold dash valve 142 to the parking brake supply port 14 on tractor protection valve 10. Referring to FIG. 5, the air enters the parking brake section 88 of housing 12 and exerts a force on the shoulder 48 of piston 38 to compress spring 40 and move piston 38 to its supply position. The air contacts the diaphragm 106 of quick release valve 32 to move it from the neutral position shown in FIG. 9 to the supply position shown in FIG. 10. Diaphragm 106 moves to the supply position because the force on side 136 of diaphragm 106 from the high pressure air within passageway 110 is greater than the force on side 138 of diaphragm 106 from the air at parking brake delivery port 16 and the atmospheric air within exhaust channel 126. The air flows around the diaphragm 106 and through the first and second supply channels 122 and 124 of quick release valve 32. The air then flows through the parking brake delivery port 16 and on to the parking brake chambers 156a-d on the trailer, which releases the parking brakes of the trailer.

When piston 38 is in the supply position and diaphragm 68 does not engage ridge 86, air can flow through tractor protection valve 10 from service brake supply ports 20 and 22 to service brake delivery port 24. This allows the driver to engage the service brakes 160a-d on the trailer for braking the trailer while driving. The driver engages the service brakes 160a-d by pressing on foot brake valve 158 or actuating hand control valve 162, which causes air to flow from reservoirs 144 through the foot brake valve 158 or hand control valve 162 to the service brake supply ports 20 and 22 on tractor protection valve 10. The air then flows through the service brake delivery port 24 on tractor protection valve 10 to the service brake chambers 160a-d, which engages the service brakes of the trailer.

When it is desired to engage the parking brakes on the vehicle, the driver actuates manifold dash valve 142 by, for example, pulling a button. This connects the parking brake supply port 14 of tractor protection valve 10 with an exhaust port of the manifold dash valve 142. Air within the tractor protection valve 10 and in the line leading from manifold dash valve 142 to tractor protection valve 10 exhausts through the manifold dash valve 142. Air within the lines 148 and 150 connecting tractor protection valve 10 to full function valve 154 exhausts through quick release valve 32 by moving the diaphragm 106 of quick release valve 32 from the neutral position shown in FIG. 9 or the supply position shown in FIG. 10 to the exhaust position shown in FIG. 11. Diaphragm 106 moves to the exhaust position because the force on side 138 of diaphragm 106 from the high pressure air within lines 148 and 150 is greater than the force on side 136 of diaphragm 106 from the air within passageway 110, which has been exhausted through manifold dash valve 142. With diaphragm 106 in the exhaust position, air flows down through the first and second supply channels 122 and 124, around the valve seat 134, upward through exhaust channel 126, and out through parking brake exhaust port 18. Air within the parking brake chambers 156a-d on the trailer exhausts to atmosphere through the full function valve 154 or exhausts through the quick release valve 32 in the manner described above. When the air in the parking brake chambers 156a-d is exhausted, the parking brakes of the trailer are applied to prevent movement of the trailer. In addition to being applied by actuation of manifold dash valve 142, the parking brakes may be applied due to a loss of pressure within the air system. After the driver actuates manifold dash valve 142 to apply the trailer's parking brakes, or upon a loss of pressure within the air system, it preferably takes less than approximately 1.5 seconds to engage the parking brakes on the trailer by exhausting the air within parking brake chambers 156a-d, full function valve 154, lines 148 and 150, and the parking brake section 88 of tractor protection valve 10. By exhausting air from the trailer parking brake supply air lines 148 and 150 faster than if the air exhausted through the manifold dash valve 142, the quick release valve 32 allows the trailer parking brakes 156a-d to engage faster.

When the air within the parking brake section 88 of tractor protection valve 10 is exhausted by moving the quick release valve 32 to the exhaust position, spring 40 moves piston 38 from the supply position shown in FIG. 5 to the exhaust position shown in FIG. 6. In the exhaust position, diaphragm 68 seals against the circular ridge 86 of housing 12 to prevent the further supply of air from the service brake supply ports 20 and 22 to the service brake delivery port 24. In the exhaust position, the opening 56 in piston 38 is positioned outside of the seals 62 and 64, which places the service brake delivery port 24 in fluid communication with the atmosphere through service brake exhaust port 26. Thus, when the piston 38 is moved to the exhaust position, any pressurized air that is within the service brake chambers 160a-d on the trailer is exhausted to the atmosphere by flowing back through service brake delivery port 24, opening 56, and service brake exhaust port 26. Exhausting the air from the service brake chambers 160a-d when the parking brakes 156a-d are applied prevents compounding, or the dual application of the parking brakes 156a-d and the service brakes 160a-d, which can damage braking system components. Service brake valve 36 moves to the exhaust position when quick release valve 32 is in the exhaust position to prevent compounding.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A tractor protection valve comprising:
   a housing that defines a parking brake supply port, a parking brake delivery port, and an exhaust port; and
   a quick release valve comprising a diaphragm that is positioned between the parking brake supply port and the parking brake delivery port, wherein the diaphragm is movable between a supply position allowing fluid to flow from the parking brake supply port to the parking brake delivery port and an exhaust position allowing fluid to flow from the parking brake delivery port to the exhaust port, wherein the quick release valve is configured for insertion in the housing through the parking brake delivery port.

2. The tractor protection valve of claim 1, wherein the quick release valve further comprises a first channel that is in fluid communication with the parking brake supply port and the parking brake delivery port when the diaphragm is in the supply position, and wherein the quick release valve further comprises a second channel that is in fluid communication with the parking brake delivery port and the exhaust port when the diaphragm is in the exhaust position.

3. The tractor protection valve of claim 2, wherein the quick release valve further comprises a valve body that defines the first channel and the second channel.

4. The tractor protection valve of claim 3, wherein the valve body comprises a first valve seat that sealingly engages the diaphragm when the diaphragm is in the supply position.

5. The tractor protection valve of claim 4, wherein the housing comprises a second valve seat that sealingly engages the diaphragm when the diaphragm is in the exhaust position.

6. The tractor protection valve of claim 1, wherein the diaphragm moves from the exhaust position to the supply position in response to air pressure in the parking brake supply port.

7. The tractor protection valve of claim 1, wherein fluid cannot flow from the parking brake supply port to the exhaust port when the diaphragm is in the supply position.

8. The tractor protection valve of claim 1, wherein fluid cannot flow from the parking brake delivery port to the parking brake supply port when the diaphragm is in the exhaust position.

9. The tractor protection valve of claim 1, wherein the housing further defines a service brake supply port, a service brake delivery port, and a service brake exhaust port, and further comprising:
a piston positioned in the housing, wherein the piston comprises a passage that places the service brake delivery port in fluid communication with the service brake exhaust port when the piston is in a first position, and wherein the piston is moveable to a second position, in which the service brake delivery port is not in fluid communication with the service brake exhaust port and the service brake supply port is in fluid communication with the service brake delivery port.

10. The tractor protection valve of claim 9, wherein the piston moves between the first position and the second position in response to air pressure in the parking brake supply port.

11. The tractor protection valve of claim 9, wherein the piston is in the first position when the diaphragm is in the exhaust position.

12. A tractor protection valve comprising:
a housing defining a parking brake supply port, a parking brake delivery port, and an exhaust port; and
a quick release valve comprising a valve body that is positioned in the housing between the parking brake supply port and the parking brake delivery port, wherein the valve body comprises a first channel and a second channel, wherein at least a portion of the quick release valve is movable between a supply position allowing fluid to flow from the parking brake supply port through the first channel to the parking brake delivery port and an exhaust position allowing fluid to flow from the parking brake delivery port through the second channel to the exhaust port, wherein the quick release valve is configured for insertion in the housing through an opening in the housing.

13. The tractor protection valve of claim 12, wherein the second channel is not in fluid communication with the parking brake delivery port or the parking brake supply port when the quick release valve is in the supply position.

14. The tractor protection valve of claim 12, wherein the quick release valve moves from the exhaust position to the supply position in response to air pressure in the parking brake supply port.

15. The tractor protection valve of claim 12, wherein the quick release valve is configured for insertion in the housing through the parking brake delivery port.

16. The tractor protection valve of claim 12, wherein the housing further defines a service brake supply port, a service brake delivery port, and a service brake exhaust port, and further comprising:
a piston positioned in the housing, wherein the piston comprises a passage that places the service brake delivery port in fluid communication with the service brake exhaust port when the piston is in a first position, and wherein the piston is moveable to a second position, in which the service brake delivery port is not in fluid communication with the service brake exhaust port and the service brake supply port is in fluid communication with the service brake delivery port.

17. The tractor protection valve of claim 16, wherein the piston moves between the first position and the second position in response to air pressure in the parking brake supply port.

18. A tractor protection valve comprising:
a housing that defines a parking brake supply port, a parking brake delivery port, a parking brake exhaust port, a service brake supply port, a service brake delivery port, and a service brake exhaust port;
a quick release valve positioned between the parking brake supply port and the parking brake delivery port, wherein at least a portion of the quick release valve is movable between a supply position allowing fluid to flow from the parking brake supply port to the parking brake delivery port and an exhaust position allowing fluid to flow from the parking brake delivery port to the parking brake exhaust port, wherein the quick release valve is configured for insertion in the housing through the parking brake delivery port; and
a service brake valve moveable between a supply position allowing fluid to flow from the service brake supply port to the service brake delivery port and an exhaust position allowing fluid to flow from the service brake delivery port to the service brake exhaust port, wherein the service brake valve is in the exhaust position when the quick release valve is in the exhaust position.

19. The tractor protection valve of claim 18, wherein the quick release valve moves from the exhaust position to the supply position in response to air pressure in the parking brake supply port.

20. The tractor protection valve of claim 18, wherein the service brake valve moves from the exhaust position to the supply position in response to air pressure in the parking brake supply port.

21. The tractor protection valve of claim 18, wherein the service brake valve comprises a piston comprising a passage that places the service brake delivery port in fluid communication with the service brake exhaust port when the service brake valve is in the exhaust position.

22. The tractor protection valve of claim 18, wherein the quick release valve further comprises a first channel that is in fluid communication with the parking brake supply port and the parking brake delivery port when the quick release valve is in the supply position, and wherein the quick release valve further comprises a second channel that is in fluid communication with the parking brake delivery port and the exhaust port when the quick release valve is in the exhaust position.

23. The tractor protection valve of claim 22, wherein the quick release valve further comprises a valve body that defines the first channel and the second channel.

* * * * *